United States Patent
Fu et al.

(10) Patent No.: US 10,180,990 B2
(45) Date of Patent: *Jan. 15, 2019

(54) ACTIVITY SENSING ONLINE PREFERENCE ASSAY

(71) Applicant: Microsoft Technology Licensing, LLC, Redmond, WA (US)

(72) Inventors: Zhoutong Fu, Stanford, CA (US); Huangming Xie, Menlo Park, CA (US); Ying Chen, Campbell, CA (US); Xin Fu, Sunnyvale, CA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 333 days.

This patent is subject to a terminal disclaimer.

(21) Appl. No.: 14/927,974

(22) Filed: Oct. 30, 2015

(65) Prior Publication Data

US 2017/0124199 A1     May 4, 2017

(51) Int. Cl.
    *G06F 17/30*     (2006.01)
    *H04L 29/08*     (2006.01)
    *G06Q 50/00*     (2012.01)

(52) U.S. Cl.
CPC .. *G06F 17/30867* (2013.01); *G06F 17/30554* (2013.01); *G06Q 50/01* (2013.01); *H04L 67/22* (2013.01); *H04L 67/306* (2013.01)

(58) Field of Classification Search
CPC ......... G06F 17/30867; G06F 17/30864; G06F 17/30554; H04L 67/22; H04L 67/306
See application file for complete search history.

(56) References Cited

U.S. PATENT DOCUMENTS

| | | | |
|---|---|---|---|
| 2002/0042786 A1 | 4/2002 | Scarborough et al. | |
| 2003/0199250 A1* | 10/2003 | Carlton | H04M 3/42008 455/41.2 |
| 2006/0238379 A1* | 10/2006 | Kimchi | G01C 21/26 340/995.1 |
| 2009/0083258 A1 | 3/2009 | Koren et al. | |

(Continued)

OTHER PUBLICATIONS

"U.S. Appl. No. 13/682,033, Examiner Interview Summary dated Jul. 22, 2016", 4 pgs.

(Continued)

*Primary Examiner* — Tarek Chbouki
(74) *Attorney, Agent, or Firm* — Schwegman Lundberg & Woessner, P.A.

(57) ABSTRACT

System and techniques for activity sensing online preference assay are described herein. An initial indication of an online activity preference for a member of a social network service may be obtained. A plurality of member activities corresponding with the online activity preference for a period of time subsequent to obtaining the initial indication may be collected. Respective decision trees of a set of decision trees may be traversed based on a set of inputs comprising the collected plurality of member activities to determine a probability that the online activity preference corresponds with the member. An actual online activity preference may be derived for the member using an aggregation of the determined probability for the respective decision trees of the set of decision trees. Social network content items may be filtered for the member based on the actual online activity preference.

21 Claims, 8 Drawing Sheets

(56) References Cited

U.S. PATENT DOCUMENTS

| | | |
|---|---|---|
| 2009/0150387 A1* | 6/2009 | Marchewitz ...... G06F 17/30864 |
| 2011/0022530 A1 | 1/2011 | Bogle et al. |
| 2011/0196802 A1 | 8/2011 | Ellis et al. |
| 2012/0041889 A1 | 2/2012 | Morrison et al. |
| 2012/0095931 A1 | 4/2012 | Gurion et al. |
| 2012/0278314 A1 | 11/2012 | Sundaresan et al. |
| 2012/0310922 A1* | 12/2012 | Johnson ............ G06F 17/30867 707/722 |
| 2013/0226856 A1* | 8/2013 | Zhang .................... G06N 7/005 706/52 |
| 2013/0275320 A1 | 10/2013 | Moore et al. |
| 2014/0089216 A1 | 3/2014 | Costa et al. |
| 2014/0143164 A1 | 5/2014 | Posse et al. |
| 2014/0143165 A1 | 5/2014 | Posse et al. |
| 2014/0297547 A1 | 10/2014 | Kruglick |
| 2015/0046935 A1* | 2/2015 | Wei .................... G06Q 30/0251 725/14 |
| 2017/0124472 A1 | 5/2017 | Fu et al. |

OTHER PUBLICATIONS

"U.S. Appl. No. 13/682,033, Final Office Action dated Apr. 6, 2016", 21 pgs.
"U.S. Appl. No. 13/682,033, Response filed Oct. 6, 2016 to Final Office Action dated Apr. 6, 2016", 20 pgs.
"U.S. Appl. No. 13/684,013, Examiner Interview Summary dated Jul. 26, 2016", 5 pgs.
"U.S. Appl. No. 13/684,013, Final Office Action dated May 5, 2016", 27 pgs.
"U.S. Appl. No. 13/684,013, Response filed Aug. 9, 2016 to Final Office Action dated May 5, 2016", 15 pgs.
"U.S. Appl. No. 13/682,033, Non Final Office Action dated Jun. 29, 2017", 17 pgs.
"U.S. Appl. No. 13/684,013, Non Final Office Action dated Jun. 19, 2017", 25 pgs.
"U.S. Appl. No. 13/682,033, Response filed Sep. 29, 2017 to Non Final Office Action dated Jun. 29, 2017", 22 pgs.
"U.S. Appl. No. 13/682,033, Non Final Office Action dated Jun. 16, 2015", 13 pgs.
"U.S. Appl. No. 13/682,033, Response filed Dec. 16, 2015 to Non Final Office Action dated Jun. 16, 2015", 18 pgs.
"U.S. Appl. No. 13/684,013, Non Final Office Action dated Jul. 17, 2015", 19 pgs.
"U.S. Appl. No. 13/684,013, Response filed Jan. 19, 2016 to Non Final Office Action dated Jul. 17, 2015", 23 pgs.
"U.S. Appl. No. 13/682,033, Examiner Interview Summary dated Oct. 6, 2017", 3 pgs.
"U.S. Appl. No. 13/682,033, Final Office Action dated Jan. 2, 2018", 23 pgs.
"U.S. Appl. No. 13/684,013, Examiner Interview Summary dated Oct. 24, 2017", 3 pgs.
"U.S. Appl. No. 13/684,013, Final Office Action dated Jan. 24, 2018", 25 pgs.
"U.S. Appl. No. 13/684,013, Response filed Oct. 19, 2017 to Non Final Office Action dated Jun. 19, 2017", 23 pgs.
"U.S. Appl. No. 13/682,033, Examiner Interview Summary dated May 17, 2018", 3 pgs.
"U.S. Appl. No. 13/682,033, Response filed Jun. 4, 2018 to Final Office Action dated Jan. 2, 2018", 17 pgs.
"U.S. Appl. No. 13/684,013, Examiner Interview Summary dated May 3, 2018", 3 pgs.

* cited by examiner

ACTIVITY SENSING ONLINE PREFERENCE ASSAY

TECHNICAL FIELD

Embodiments described herein generally relate to action preference detection and content selection and more specifically to action preference detection and content selection in a social networking service.

BACKGROUND

A social networking service is a computer or web-based service that enables users to establish links or connections with persons for the purpose of sharing information with one another. Some social network services aim to enable friends and family to communicate and share with one another, while others are specifically directed to business users with a goal of facilitating the establishment of professional networks and the sharing of business information. For purposes of the present disclosure, the terms "social network" and "social networking service" are used in a broad sense and are meant to encompass services aimed at connecting friends and family (often referred to simply as "social networks"), as well as services that are specifically directed to enabling business people to connect and share business information (also commonly referred to as "social networks" but sometimes referred to as "business networks" or "professional networks").

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
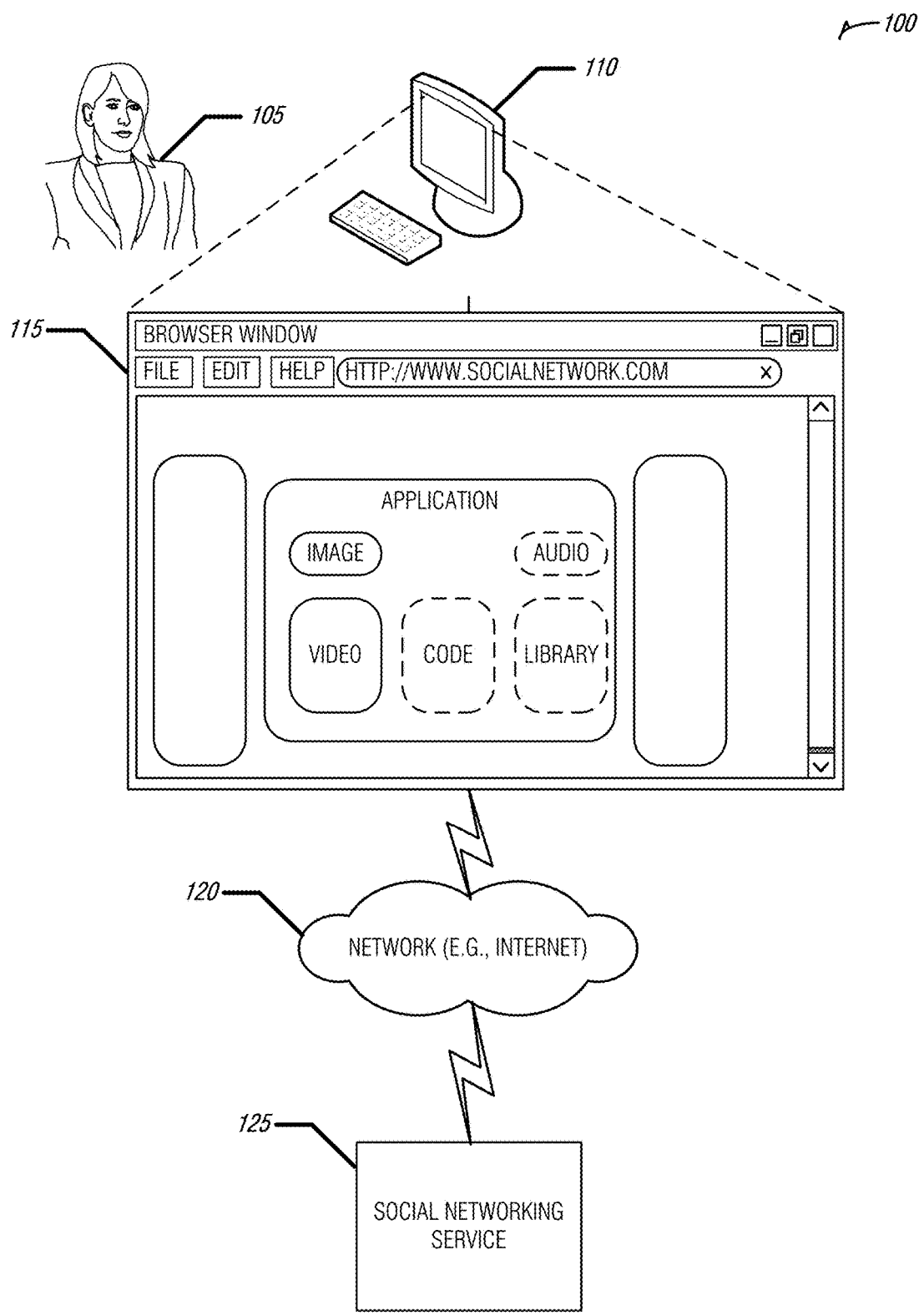
FIG. 1 illustrates a block diagram of an example of an environment including a social networking service, according to some embodiments.

Social network services allow people to connect with friends, family, and business associates that they may not be able to physically connect with on a regular basis. For example, family members may be spread across a large geographic are making travel difficult. Social network services may allow the family members to bridge such a geographic divide by providing instant access to the activities of each family member.

Social networking services may also provide people that would not have had an opportunity to meet in the pre-internet era with the ability to connect to establish new friendships or business relationships. For example, a person looking for employment may be contacted about a job opportunity based on his or her social networking profile found by a potential employer. However, the increasing popularity of social network services may make it difficult to distinguish a person using a social network for connecting with friends and family from a person using a social network for employment.

A member may leave the social network service if not provided with content tailored to the initial online activity preference that led them to join the social network service or if the content provided does not match the member's changing online activity preferences. Rapidly selecting content matching an online activity preference of the member may be accomplished by detecting the member's initial online activity preference on the social networking service. For example, the member may wish to find job opportunities. In an example, the member may be presented with an option to select a reason for joining the social network upon signup. This initial indication of an online activity preference may be helpful in presenting content to which the member has an affinity, however, the actions of the member on the social network may be a better indicator of the member's actual online activity preference. A member's online activity preference may change over time so the social network service may wish to reevaluate a member's activities so that content can be filtered based on the member's changing online activity preferences. For example, a member may have initially joined the social network to connect with friends and family, but after some period of time would now like to use the social network service to find employment. The social network service may analyze the member's activity over a period of time to identify this change in online activity preference and filter content based on that online activity preference.

In an example, the member's activities may be collected over a period of time and the member's activities may be used as input into a decision tree that indicates or contraindicates the member's intent and/or initial online activity preference. In an example, a set of decision trees may be generated based on the initial indication of an online activity preference and/or an online activity preference label assigned to the member by the social networking service to be used in evaluating whether the initially indicated and/or labeled online activity preference corresponds with the member. In an example, one branch of the decision tree may describe a criteria used to classify the member's online activity preference. For example, the member may have averaged over 2.1 views of job postings, averaged more than 0.12 job applications, and averaged over 0.25 job searches over a two week period which may indicate that there is a 93% probability that the member in seeking a new job. In some examples, several decision trees may be generated and each of the decision trees may be traversed to derive a probability for the indicated preference. Using several decision trees may increase the precision (e.g., correct predictions of a member's actual online activity preference compared to the total number of members for which predictions were made) and recall (e.g., correct predictions of a member's actual online activity preference compared to the total number of members having the initial indication of the online activity preference) when evaluating the online activity preference of members.

In an example, each of the probabilities derived from each of the decision trees may be aggregated to determine the member's preference for job seeking activity. For example, 10 decision trees may have been generated and 7 indicate a preference for job seeking activity and contraindicate a preference for job seeking activity leading to the determination that the member has an actual preference for job seeking activity.

FIG. 1 illustrates a block diagram of an example of an environment 100 including a member of a social network 105 (e.g., a person, entity, etc.), a user device 110 (e.g., a computer, smartphone, tablet, etc.), a user interface 115 (a web page, application window, etc.), a computer network 120 (e.g., the internet, wired network, wireless network, etc.), a social network service 125, according to an embodiment. The user device 110 may display a user interface 115 that may be provided by the social networking service 125 over the computer network 120 (e.g., the internet, etc.).

The social network service 125 may include one or more features. The one or more features may provide the member 105 with the ability to complete actions on the social network service 125. For example the one or more features may include the providing the ability to browse or search member profiles, companies, jobs; submit job applications; create connections with other members of the social network service, etc. In addition, the one or more features may provide the member with the ability to provide profile information. For example, the one or more features may allow the member 105 to add an industry, occupation, name, email address, etc. to the member's 105 profile. The one or more features may use information about the member 105 and the member's 105 actions. The information may be collected or derived by the social network service 125. The one or more features may be displayed to the member 105 via the user interface 115 or may be processed by the social network service 125 without display to the member 105.

The features of the social network service 125 may allow the member 105 to complete various actions or activities. Actions that may be completed by the member include by way of example and not limitation:

Viewing job postings listed on the social network service 125

Searching job postings listed on the social network service 125

Submitting a job application using the social network service 125 for a job viewed using the social network service 125

Submitting a job application using the social network service 125

Viewing profiles of other members of the social network service 125

Following member companies of the social network service 125

Making connections to other members of the social network service 125

Searching for members of the social network service 125

Interacting with props of the social network service 125 (e.g., interactive elements provided on the social network service)

Indicating an initial online activity preference.

Etc.

The social network service 125 may use the member 105 actions to detect online activity preferences of the member 105. In some embodiments, a new member may self-label themselves as having an initial online activity preference. For example, a member 105 may join the social network service 125 and during sign-up may indicate that the reason for joining is to look for a job (e.g., job seeking activity). The social network service 125 may then provide content to the member 105 target towards job seeking. Because the member 105 is new to the social network service 125 there may be little member activity for the social network service 125 to evaluate. However, knowing that the member 105 is looking for work may cause the social network service 125 to begin collecting actions of the member 105 that may confirm the member's 105 preference for job seeking activity.

In some embodiments, an existing member may be labeled with an initial online activity preference based on actions performed on the social network service 125 and/or may self-label themselves as having an initial online activity preference. If the member 105 has been a member of the social network service 125 for some time, rather than explicitly asking the member what their intentions are, the system may assign a label to the member based upon activities of the member. For example, the member 105 may have completed several actions using the features of the social network service 125. The social network service may evaluate one or more actions corresponding with an online activity preference to assign the label to the member 105. For example, if the member 105 completes several job searches and/or views over a period of time the social network service may label the member 105 as a job seeker. The social network service may then further evaluate the actions of the member 105 over the same period of a different period to verify that the member 105 has an online activity preference of job seeker.

As already mentioned to establish the online activity preference of the member 105 the social network service 125 may use a variety of computer learning algorithms that may predict the probability that the online activity preference corresponds with the member such as, by way of example and not limitation, decision trees. For example, a random set of decision trees may be generated with several member actions, member profile components, and/or social graph information that may each determine a probability that the member has the initially indicated online activity preference. The social network service 125 may evaluate stored information associated with the member 105 through several decision trees of the set and then aggregate the individual probabilities. For example, by comparing the negative count (e.g., the number of decision tree results indicating it is unlikely that the member has the online activity preference) to the positive count (e.g., the number of decision tree results indicating it is likely that the member has the online activity preference) and/or creating a composite probability from the results of the individual decision tree results (e.g., summing the individual probabilities, averaging the individual probabilities, etc). Verifying the initial online activity preference may establish that the member 105 still has the online activity preference and/or that the member did not erroneously select an improper online activity preference at sign-up.

Upon verification of the member's 105 online activity profile, a content filter may be created based on the online activity preference. For example, a member with an online activity preference of job seeker may be provided with job postings listed on the social network service 125 matching components of the member's social network profile. The content filter may be added to the profile of the member 105 and may generate messages and/or user interfaces containing jobs or companies in which the member 105, preferring job seeking activity, may have an interest.

In some embodiments, the content filter may actively generate content for the member. In an example, the content filter may transmit to the member 105 subscription options that correspond with the online activity preference. For example, a premium subscription may allow the member to connect with other members (e.g., recruiters) of the social network service 125 that are outside the social graph of the member 105. The member 105 may then be able to add the subscription service to their social network profile and/or account. The content filter may provide the member 105 with content feeds that correspond with the online activity preference. For example, a member with a job seeking online activity preference may be sent posts by companies or recruiters related to the member's industry and/or profession, new job postings, job applications, suggestions to follow companies or other members, etc. The content filter may also move the member 105 higher in a listing corresponding with the online activity preference. For example, a member with a job seeking online activity preference may appear higher in a list of candidates returned in a candidate search by a recruiter.

Figure 2:
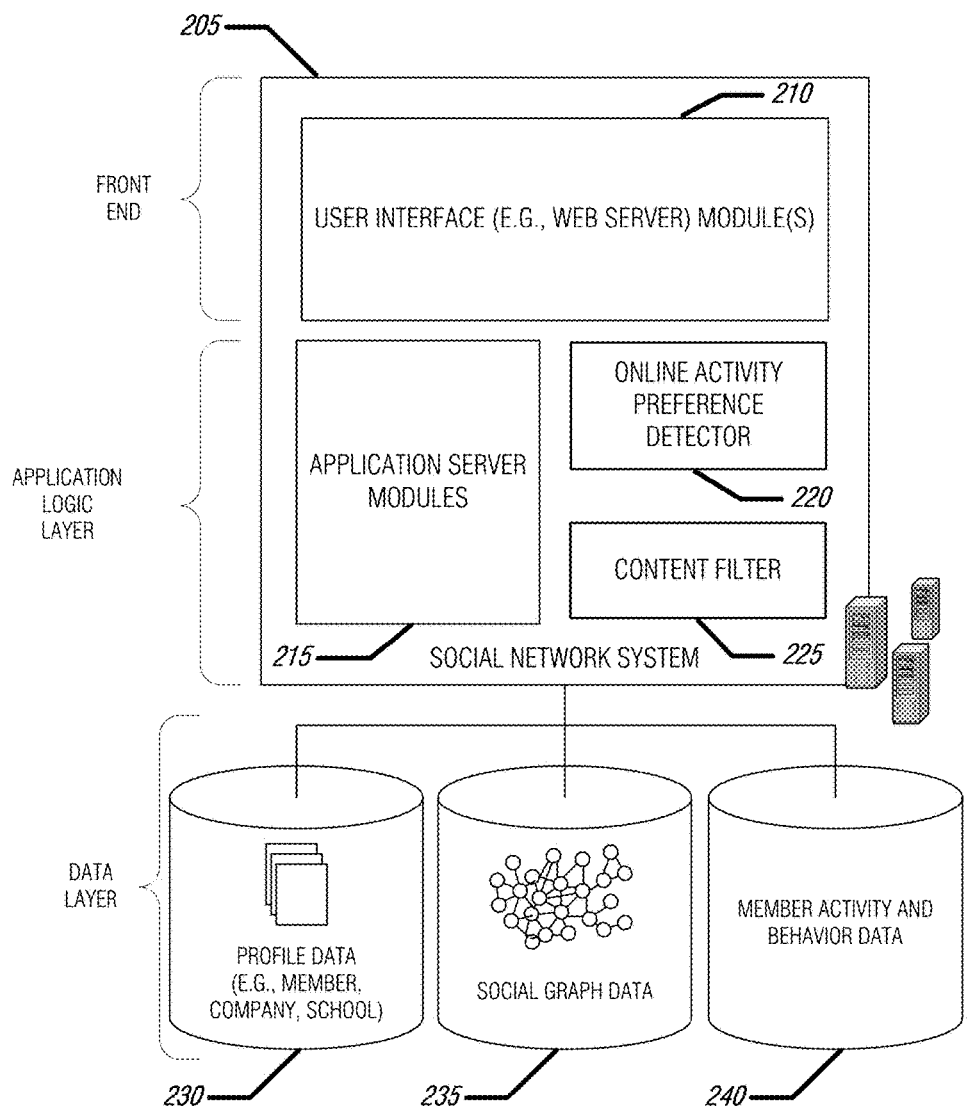
FIG. 2 is a block diagram illustrating the functional components of a social network service including an online preference detector and a content filter, according to some embodiments.

FIG. 2 is a block diagram illustrating the functional components of a social network service 200 including data processing components referred to herein as an online activity preference detector 220 and a content filter 225, for use in detecting an online activity preference of a member and filtering social network content for the member, according to an embodiment. As shown in FIG. 2, the front end consists of a user interface module (e.g., a web server) 210, which receives requests from various client-computing devices, and communicates appropriate responses to the requesting client devices. For example, the user interface module(s) 210 may receive requests in the form of Hypertext Transport Protocol (HTTP) requests, or other web-based, application programming interface (API) requests. The application logic layer includes various application server modules 215, which, in conjunction with the user interface module(s) 210, generates various user interfaces (e.g., web pages) with data retrieved from various data sources in the data layer.

With some embodiments, individual application server modules 215 are used to implement the functionality associated with various applications and/or services provided by the social network service. For example, with some embodiments, the social network service may provide an application or service that allows companies and/or people to post information about available job openings—such information generally referred to as a job posting or job listing. Accordingly, members of the social network service can search for and browse available job listings. In another example, the content filter 225 may automatically identify a set of job listings that are likely to be of interest to a particular member. The content filter 225 may present a member with a set of job listings that are likely to be of interest to the member. The set of job listings may be presented in a content module displayed on some portion of a web page, the user interface of a mobile device (e.g., phone or tablet computing device), or in an email or other message sent to the member on a periodic basis. As members interact with the content associated with the job listings, the interactions are detected and logged. Accordingly, the frequency and nature of the interactions can be used as input data for the online activity preference detector 220 that determines the online activity preference for the member which may then be used as an input to the content filter 225 to output content relevant to the member's online activity preference.

As shown in FIG. 2, the data layer includes several databases, such as a database 230 for storing profile data, including both member profile data as well as profile data for various organizations (e.g., companies, schools, etc.). Consistent with some embodiments, when a person initially registers to become a member of the social network service, the person will be prompted to provide some personal information, such as his or her name, age (e.g., birthdate), gender, interests, contact information, home town, address, the names of the member's spouse and/or family members, educational background (e.g., schools, majors, matriculation and/or graduation dates, etc.), employment history, skills, professional organizations, and so on. This information is stored, for example, in the database with reference number 230. Similarly, when a representative of an organization initially registers the organization with the social network service, the representative may be prompted to provide certain information about the organization. This information may be stored, for example, in the database with reference number 230, or another database (not shown). With some embodiments, the profile data may be processed (e.g., in the background or offline) to generate various derived profile data. For example, if a member has provided information about various job titles the member has held with the same company or different companies, and for how long, this information can be used to infer or derive a member profile attribute indicating the member's overall seniority level, or seniority level within a particular company. With some embodiments, importing or otherwise accessing data from one or more externally hosted data sources may enhance profile data for both members and organizations. For instance, with companies in particular, financial data may be imported from one or more external data sources, and made part of a company's profile.

Once registered, a member may invite other members, or be invited by other members, to connect via the social network service. A "connection" may require a bi-lateral agreement by the members, such that both members acknowledge the establishment of the connection. Similarly, with some embodiments, a member may elect to "follow" another member. In contrast to establishing a connection, the concept of "following" another member typically is a unilateral operation, and at least with some embodiments, does not require acknowledgement or approval by the member that is being followed. When one member follows another, the member who is following may receive status updates (e.g., in an activity or content stream) or other messages published by the member being followed, or relating to various activities undertaken by the member being followed. Similarly, when a member follows an organization, the member becomes eligible to receive messages or status updates published on behalf of the organization. For instance, messages or status updates published on behalf of an organization that a member is following will appear in the member's personalized data feed, commonly referred to as an activity stream or content stream. In any case, the various associations and relationships that the members establish with other members, or with other entities and objects, are stored and maintained within the social graph, shown in FIG. 2 with reference number 235.

The social network service may provide a broad range of other applications and services that allow members the opportunity to share and receive information, often customized or personalized to the interests of the member. For example, with some embodiments, the social network service may include a photo sharing application that allows members to upload and share photos with other members. With some embodiments, members may be able to self-organize into groups, or interest groups, organized around a subject matter or topic of interest. With some embodiments, the social network service may provide a feature or service that identifies members of the social network service with which a particular member is likely to be acquainted.

As members interact with the various applications, services and content made available via the social network service, the members' behavior (e.g., content viewed, links or buttons selected, messages responded to, etc.) may be tracked and information concerning the member's activities and behavior may be logged or stored, for example, as indicated in FIG. 2 by the database with reference number 240. This information may be used to classify or label the member as being in various classifications or categories. For example, if the member frequently submits job applications, thereby exhibiting behavior indicating that the member is a job-seeker, this information can be used to label the member as an active job-seeker. With some embodiments, a new member may label themselves with an online activity preference of active job seeker. With some embodiments, the label, either determined by the social network service, or self-selected, can then be verified as an online activity preference by inputting a plurality of member activities into a set of decision trees to determine the probability that the member has an online activity preference of active job seeker. With some embodiments, the online activity preference can then be used as a member profile attribute or a content filter for purposes of enabling others to target the member for receiving messages or status updates, advertisements, or information relating to new job listings. Accordingly, a company that has available job openings can publish a message that is specifically directed to certain members of the social network service who are, based on a job-seeker score or classification, likely to be receptive to recruiting efforts.

As illustrated in FIG. 2, the social network system includes what is referred to as an online activity preference detector 220. The online activity preference detector receives, as input, data from any one or more of the databases 230, 235 and 240, and computes or derives for each member of the social network service an online activity preference based on the probability that the member is using the social network service for preferred activities. For example, the member may be an active job seeker and is using the social network service to find employment opportunities. The output of the online activity preference detector 220 is then used as input to the content filter 225. The content filter 225 provides the member with content items and activity options that correspond to the detected online activity preference of the member. For example, the content filter may present the member with GUI elements allowing the member to view third-party content relevant to the member's online activity preference. The operation of the online activity preference detector 220 and content filter 225 are described in greater detail below in connection with the description of FIG. 5.

Although not shown, with some embodiments, the social network system 205 provides an application programming interface (API) module via which applications and services can access various data and services provided or maintained by the social network service. For example, using an API, an application may be able to request the online activity preference or content filter based on the online activity preference for a particular member identified by a member identifier. Such applications may be browser-based applications, or may be operating system-specific. In particular, some applications may reside and execute on one or more mobile devices (e.g., phone, or tablet computing devices) with a mobile operating system. Furthermore, while in many cases the applications or services that leverage the API may be applications and services that are developed and maintained by the entity operating the social network service, other than data privacy concerns, nothing prevents the API from being provided to the public or to certain third-parties under special arrangements, thereby making the member's online activity preference or content filter based on the member's online activity preference available to third party applications and services.

Figure 3:
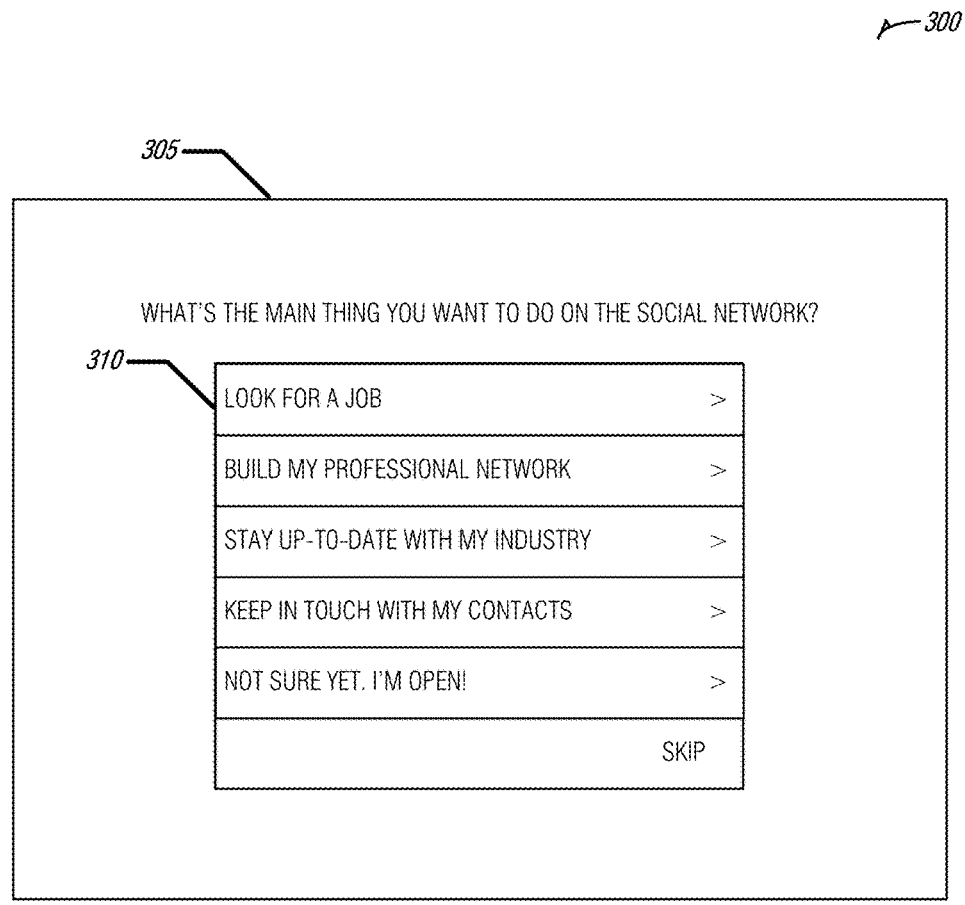
FIG. 3 illustrates an example of a user interface for receiving an initial indication of an online activity preference, according to some embodiments.

FIG. 3 illustrates an example of a user interface 300 for receiving an initial indication of an online activity preference, according to an embodiment. In some embodiments, a member may be presented with an option to self-select an online activity preference. For example, a new member may be presented with a dialog box 305 during profile creation that requests the member provide one or more reasons for joining the social network service. For example, the member may select a look for a job interface element 310 if the member is primarily interested in using the social network service to find employment.

The member's self-selected online activity preference may then be used by the social network service to begin providing targeted content to the member until the member's online activity preference can be verified. For example, by inputting the member's activities into the online activity preference detector 220 as described in FIG. 2.

Figure 4:
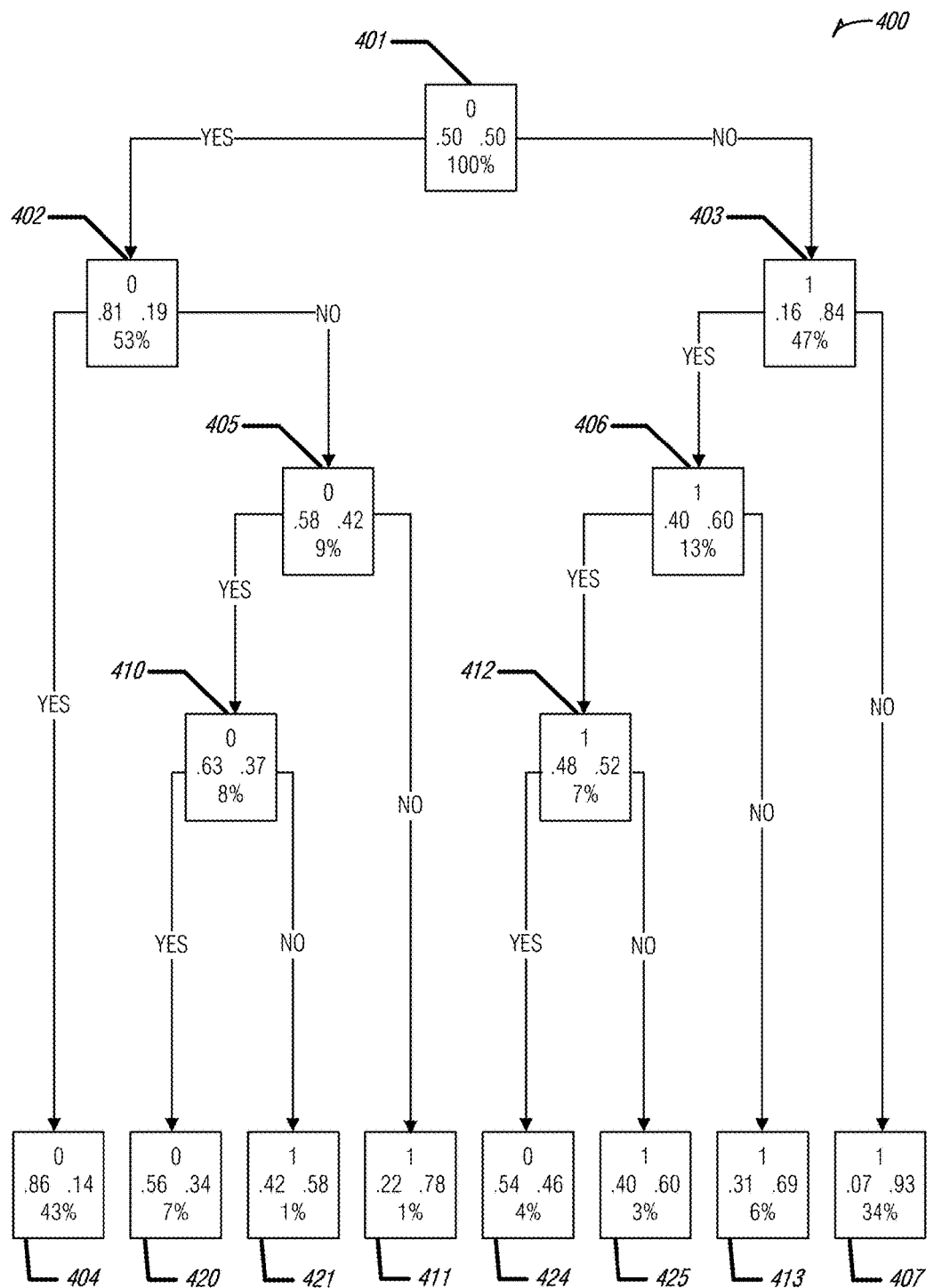
FIG. 4 illustrates a flowchart of an example of a decision tree for determining the probability that a member has a particular online activity preference, according to some embodiments.

FIG. 4 illustrates a flowchart of an example of a decision tree 400 for determining the probability that a member has a particular online activity preference, according to an embodiment. The decision tree 400 may be used by the online activity preference detector 220 as described in FIG. 2 in determining or verifying the online activity preference of a member of the social network service. Example embodiments may include traversing respective decision trees of a set of decision trees to determine the probability that an online activity preference corresponds with a member profile. The decision tree 400 may be generated using information contained in databases 230, 235, and 240 as described in FIG. 2 or may be created from information stored in other databases of the social network service (not shown).

It will be understood that the decision tree 400 may be created using various machine learning techniques such as for example, using a random forest, bootstrap aggregating, instance-based learning, etc., to construct the set of decision trees including decision tree 400 during training cycles. For example, the decision trees may be generated by evaluating a set of data obtained from a set of members of the social network service (e.g., profile data 230, member activity and/or behavior data 240, social graph data 235, etc.) using one or more machine learning techniques to output a decision tree that corresponds to a shared attribute of the set of member. The set of data may be labeled using a variety of supervised, unsupervised, and/or semi-supervised machine learning techniques. A set of inputs such as a plurality of member actions is then processed by respective decision trees of the set of decision trees to determine the probability that the online activity preference corresponds with the member profile (e.g., through classification, regression, etc.). Decision tree 400 may contain a plurality of branches each containing a plurality of decision nodes against which the inputs are evaluated. The probabilities associated with each node may be calculated by inputting data collected for a plurality of members of the social network service into various algorithms employing statistical techniques such as, by way of example and not limitation, Bayesian learning, MAP hypothesis, etc. to output an individual probability associated with the particular input beyond a threshold.

For Example, decision tree 400 evaluating whether an online activity preference of "job seeker" corresponds to the member profile begins processing at node 401 by evaluating whether the member's average job views are less than 0.62. If the average job views are less than 0.62 processing continues to node 402 where the inputs are evaluated to determine if the member's job views are less than 0.12. If the evaluation of the inputs at node 402 determines that the member's average job views are less than 0.12 processing continues to node 404 and the decision tree 400 outputs a negative response indicating that it is improbable that the an online activity preference of job seeker corresponds to the member profile.

If the evaluation of the inputs at node 402 determines that the member's average job views is greater than 0.12 processing continues to node 405 and the inputs are evaluated to determine whether the member's average job applications are less than 0.12. If the evaluation of the inputs at node 405 determines that the member's average job applications is greater than 0.12 processing continues to node 410 and the inputs are evaluated to determine if the member's average job search is less than 0.62. If the evaluation at node 410 determines that the member's average job search is less than 0.62 processing continues to node 420 and the decision tree 400 outputs a negative response indicating that it is improbable that the an online activity preference of job seeker corresponds to the member profile. If the evaluation of the inputs at node 410 determines that the member's average job search is greater than 0.62 processing continues to node 421 and the decision tree 400 outputs a positive response indicating that it is probable that the an online activity preference of job seeker corresponds to the member profile.

If the evaluation of the inputs at node 405 determines that the member's average job applications are greater than 0.12 processing continues to node 411 and the decision tree 400 outputs a positive response indicating that it is probable that the an online activity preference of job seeker corresponds to the member profile.

If the evaluation of the inputs at node 401 determines that the member's average job views are greater than 0.62 processing continues to node 403 and the inputs are evaluated to determine if the member's average job applications are less than 0.12. If the evaluation of the inputs at node 403 determines that the member's average job applications is greater than 0.12 processing continues to node 407 and the decision tree 400 outputs a positive response indicating that it is probable that the an online activity preference of job seeker corresponds to the member profile.

If the evaluation of the inputs at node 403 determines that the member's average job applications is less than 0.12 processing continues to node 406 and the inputs are evaluated to determine if the member's average job views are less than 2.1. If the evaluation of the inputs at node 406 determines that the member's average job views are greater than 2.1 processing continues to node 413 and the decision tree 400 outputs a positive response indicating that it is probable that the an online activity preference of job seeker corresponds to the member profile.

If the evaluation of the inputs at node 406 determines that the member's average job views are less than 2.1 processing continues to node 412 and the inputs are evaluated to determine if the member's average job search is less than 0.25. If the evaluation of the inputs at node 412 determines that the member's average job search is greater than 0.25 processing continues to node 425 and the decision tree 400 outputs a positive response indicating that it is probable that the an online activity preference of job seeker corresponds to the member profile.

If the evaluation of the inputs at node 412 determines that the member's average job search is less than 0.25 processing continues to node 424 and the decision tree 400 outputs a negative response indicating that it is improbable that the an online activity preference of job seeker corresponds to the member profile.

Decision tree 400 may be one of several decision trees used in determine if an online activity preference corresponds with a member. Different sets of decision trees may be selected that correspond with the online activity preference being evaluated. For example, the set of decision trees selected to determine is a member's actual online activity preference matches and initial online activity preference of job seeker may be different than a set of decision trees selected to determine if the member's initial activity preference of connect with friends corresponds with the member. Each of the decision trees may contain different nodes evaluating different inputs such that each branch of each tree in each decision tree may represent a separate paths each resulting a unique probability indicating whether or not the online activity preference corresponds with the member. Thus, several possible variations are provided with may result in higher precision and recall.

The output of decision tree 400 may then be aggregated with other decision trees of the set of decision trees to determine an ultimate probability that the online activity preference of job seeker corresponds to the member profile. In an example, the aggregation may compare the total number of positive and negative outputs. For example, in a situation where there are 10 decision trees in the set of decision trees 7 positive results may be returned and 3 negative results may be returned resulting in an ultimate positive probability that the online activity preference of job seeker corresponds with the member profile.

In an example, each decision tree of the set of decision trees may return a probability value indicating the probability that the online activity preference corresponds with the member profile and the probability value for each decision tree of the set may be combined and compared to a threshold value to determine the ultimate probability that the online activity profile corresponds to the member profile.

It will be understood that the inputs for the set of decision trees including decision tree 400 may include various data collected by the social network service. Some of the inputs, by way of example and not limitation, may include:

Average job views of past 4 weeks
Average job applications of past 4 weeks
Job views of past week
Average job searches of past 4 weeks
Has job views or not of past 1 week
Average total member value actions of past 4 weeks
Conversion rate from job views to job applications of past 1 week Job applications of past 1 week
Has job applications or not of past 1 week
Total member value actions of past 1 week
Percentage of job searches of past 1 week
Industry
Average total searches of past 4 weeks
Job searches of past 1 week
Average non-self profile views of past 4 weeks
Average of company follows of past 4 weeks
Average of connections made of past 4 weeks
Average of people searches of past 4 weeks
Percentage of people searches of past 4 weeks
Total connections
Non-self profile views of past 1 week
Total searches of past 1 week
Connections made of past 1 week
Interface locale
Average props interacted of past 4 weeks
Job views (Normalized)
Job Search (Normalized)
Total member value actions
Non-self profile views
Job views
Connection made (Normalized)
Job search
People search (Normalized)
Connection made
Invites sent member-to-member
Total invites sent
Number of unknown queries
Has job view or not
Company follows (Normalized)
Etc.

Figure 5:
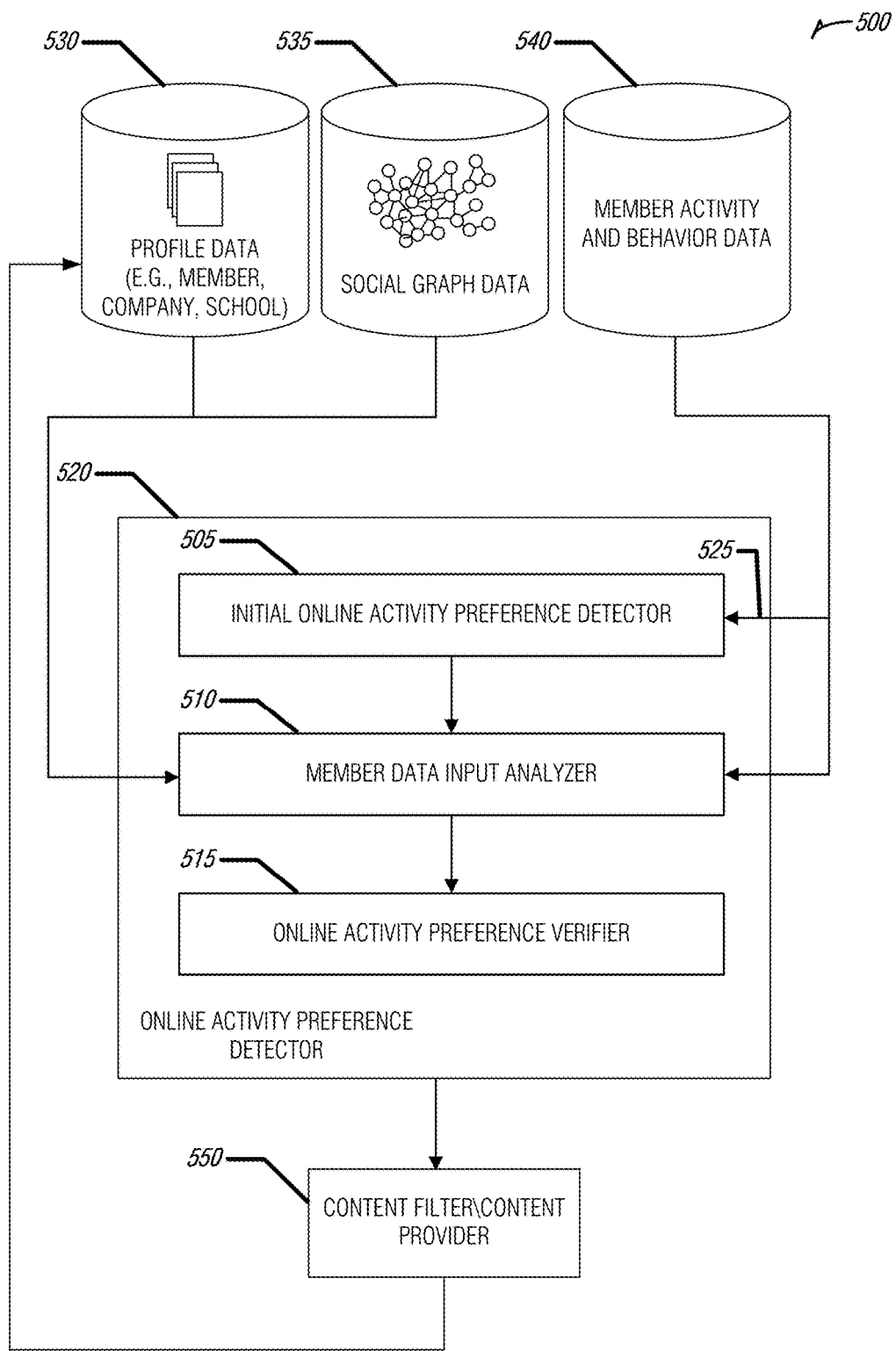
FIG. 5 is a block diagram illustrating the functional components of a social network service and the flow that occurs during a method for detecting or otherwise deriving an online activity preference and filtering content, according to some embodiments.

FIG. 5 is a block diagram illustrating the functional components of a social network service and the flow that occurs during a method for detecting or otherwise deriving an online activity preference of a member and filtering social network content for a member, according to an embodiment. As illustrated in FIG. 5, with some embodiments, the online activity preference detector 520 receives as input data from any one or more of three data sources, to include member profile data 530, social graph data 535, and member activity and/or behavioral data 540.

The online activity preference detector 520 contains an initial online activity detector 505 to obtain an initial indication of an online activity preference for a member. An initial indication of an online activity preference for a member of the social networking service is obtained by the initial online activity detector 505 (e.g., by receiving inputs from the member activity and/or behavioral data 540 as shown in 525). In an example, the initial indication of the online activity preference is obtained from a selectable graphical user interface element selected by the member. For example, the member may be presented with the graphical user interface 305 as described in FIG. 3 and the selection of a graphical user interface element may be obtained as the initial indication of the online activity preference. In an example, the initial indication of the online activity preference is obtained by the initial online activity preference detector 505 using a pattern of member activity (e.g., received from member activity and/or behavioral data 540) above a threshold.

The online activity preference detector uses the member data input analyzer to determine the probability that the member's actions indicate the member has an online activity preference matching the initial online activity preference. A plurality of member activities corresponding with the online activity preference for a period of time subsequent to obtaining the initial indication are collected (e.g., from member profile data 530, social graph data 535, member activity and/or behavioral data 540, etc.).

In some embodiments, a count for an action completed by a member of a social network is detected by the initial online activity preference detector 505 over a first period of time. The member is labeled with an online activity preference based on the count and a subset of the first period of time. In some embodiments, a plurality of member activities corresponding with the online activity preference for a second period of time prior to the first period of time are collected. In an example, the action completed is submitting a job application using the social network service. In an example, the first period of time is three weeks. In an example, the subset of the first period of time is one week. In an example, the count is at least 2.

In an example, the initial online activity preference detector includes a second subset of the first period of time, wherein the second subset of time is one week, and the labeling the member with the online activity preference is based on the count corresponding to the subset of the first period of time and the count corresponding to the second subset of the first period of time.

Respective decision trees of a set of decision trees are traversed, based on a set of inputs comprising the collected plurality of member activities (e.g., member activity and/or behavioral data 540), to determine a probability that the online activity preference corresponds with the member. For example, the respective decision trees may include various decision tress such as, for example, decision tree 400 as described in FIG. 4. In an example, the set of inputs further comprises a set of profile information corresponding to the member (e.g., member profile data 530). In an example, the set of inputs further comprises a plurality of search activities for the member. In an example, the set of inputs further comprises social graph information corresponding to the member (e.g., social graph data 535).

The decision trees may evaluate member activities (e.g., viewing job listings, submitting job applications, etc.). In an example, each decision tree in the set of decision trees includes a plurality of member action nodes corresponding to a plurality of member actions. The traversing the respective decision trees of the set of decision trees to determine the probability that the online activity corresponds to the member may include comparing the set of inputs to a threshold associated with a member action corresponding with each of the plurality of member action nodes.

The decision trees may evaluate specific classes of member activity (e.g., member's search activity). In an example, each decision tree in the set of decision trees includes a plurality of member search nodes corresponding to a plurality of member search activities. The traversing the respective decision trees of the set of decision trees to determine the probability that the online activity corresponds to the member may include comparing the set of inputs to a threshold associated with a member search activity corresponding with each of the plurality of member search nodes.

The decision trees may evaluate member profile attributes, (e.g., employment industry, job title, etc.). In an example, each decision tree in the set of decision trees includes a plurality of member profile component nodes corresponding to a plurality of member profile components. The traversing the respective decision trees of the set of decision trees to determine the probability that the online activity corresponds to the member may include comparing the set of inputs to a threshold associated with a member profile component corresponding with each of the plurality of member profile component nodes.

The online activity preference detector 520 includes an online activity preference verifier 515 to derive an actual online activity preference for the member. An actual online activity preference is derived for the member using an aggregation of the determined probability for the respective decision trees of the set of decision trees. In an example, the aggregation may compare a count of positive probabilities and a count of negative probabilities output by the respective of the respective decision trees of the set of decision trees. In an example, the aggregation may generate a composite probability using the determined probability for the respective decision trees of the set of decision trees.

The online activity preference detector 520 generates a content filter\content provider 550 to filter social network content provided to the member. Social network content items are filtered for the member based on the actual online activity preference. The content filter\content provider 550 may be associated with the member's identifier and stored as part of the member's member profile (e.g., member profile data 530). In an example, filtering the social networking content items includes sending an email to the member including a content item corresponding to the actual activity preference. In an example, filtering the social networking content items includes presenting the member with a set of social networking content items corresponding to the actual online activity preference on a graphical user interface of the social networking service.

In some embodiments, the content filter\content provider 550 may compare a member profile of the member to a query of a second member of the social networking service, retrieve the member profile in response to the query, and present the member profile to the second member based on the actual online activity preference. In some embodiments, the content filter\content provider 550 may select a subscription option for the member based on the actual online activity preference and transmit a message to the member including a selectable user interface element to update an account of the member to include the subscription option.

Figure 6:
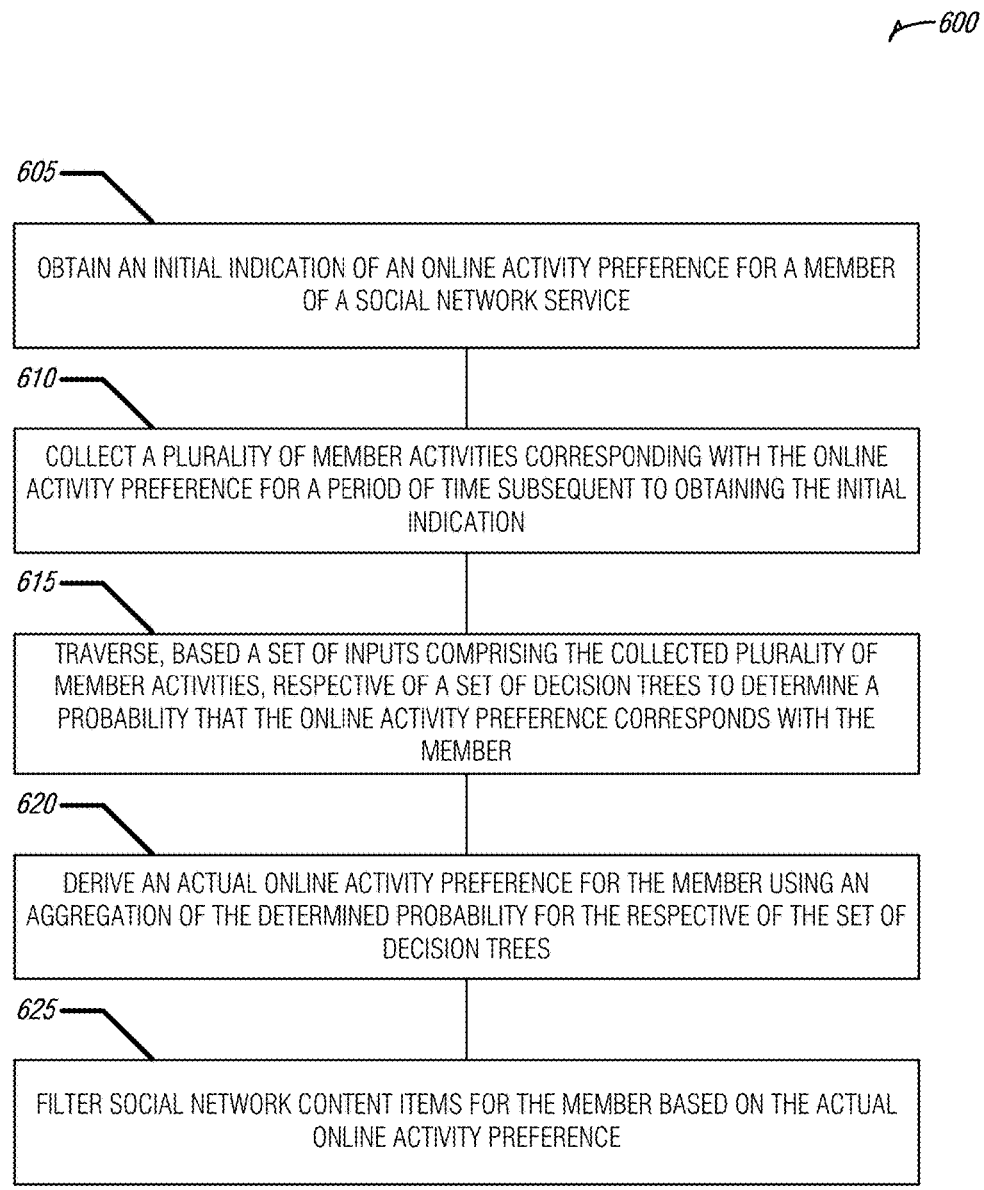
FIG. 6 is a flow diagram illustrating method operations of a method for activity sensing online preference assay, according to some embodiments.

FIG. 6 is a flow diagram illustrating method operations of a method 600 for activity sensing online preference assay, according to an embodiment. At operation 605 an initial indication of an online activity preference is obtained for a member of a social network service. In an example, the initial indication of the online activity preference is obtained from a selectable graphical user interface element selected by the member. In an example, the initial indication of the online activity preference is obtained using a pattern of member activity above a threshold.

At operation 610, a plurality of member activities corresponding with the online activity preference are collected for a period of time subsequent to obtaining the initial indication as described at operation 605.

At operation 615, respective decision trees of a set of decision trees are traversed to determine a probability that the online activity preference corresponds with the member based on a set of inputs comprising the plurality of member activities collected at operation 610. In an example, the set of inputs further comprises a set of profile information corresponding to the member. In an example, the set of inputs further comprises a plurality of search activities for the member. In an example, the set of inputs further comprises social graph data corresponding to the member.

In an example, each decision tree in the set of decision trees includes a plurality of member action nodes corresponding to a plurality of member actions. In an example, the traversing the respective decision trees of the set of decision trees to determine the probability that the online activity corresponds to the member includes comparing the set of inputs to a threshold associated with a member action corresponding with each of the plurality of member action nodes.

In an example, each decision tree in the set of decision trees includes a plurality of member search nodes corresponding to a plurality of member search activities. In an example, the traversing the respective decision trees of the set of decision trees to determine the probability that the online activity corresponds to the member includes comparing the set of inputs to a threshold associated with a member search activity corresponding with each of the plurality of member search activity nodes.

In an example, each decision tree in the set of decision trees includes a plurality of member profile component nodes corresponding to a plurality of member profile components. In an example, the traversing the respective decision trees of the set of decision trees to determine the probability that the online activity corresponds to the member includes comparing the set of inputs to a threshold associated with a member profile component corresponding with each of the plurality of member profile component nodes.

At operation 620, an actual online activity preference is derived for the member using an aggregation of the determined probability for the respective decision trees of the set of decision trees.

At operation, 625, social network content items are filtered for the member based on the actual online activity preference. In an example, filtering the social network content items includes sending an email to the member including a content item corresponding to the actual online activity preference. In an example, filtering the social network content items includes presenting the member with a set of social network content items corresponding to the actual online activity preference on a graphical user interface of the social network service.

In some embodiments, a member profile may be compared to a query of a second member of the social network service, the member profile may be retrieved in response to the query, and the member profile may be presented to the second member based on the actual online activity preference. In some embodiments, a subscription option for the member may be selected for the member based on the actual online activity preference and a message may be transmitted to the member including a selectable user interface element to update an account of the member to include the subscription option.

Figure 7:
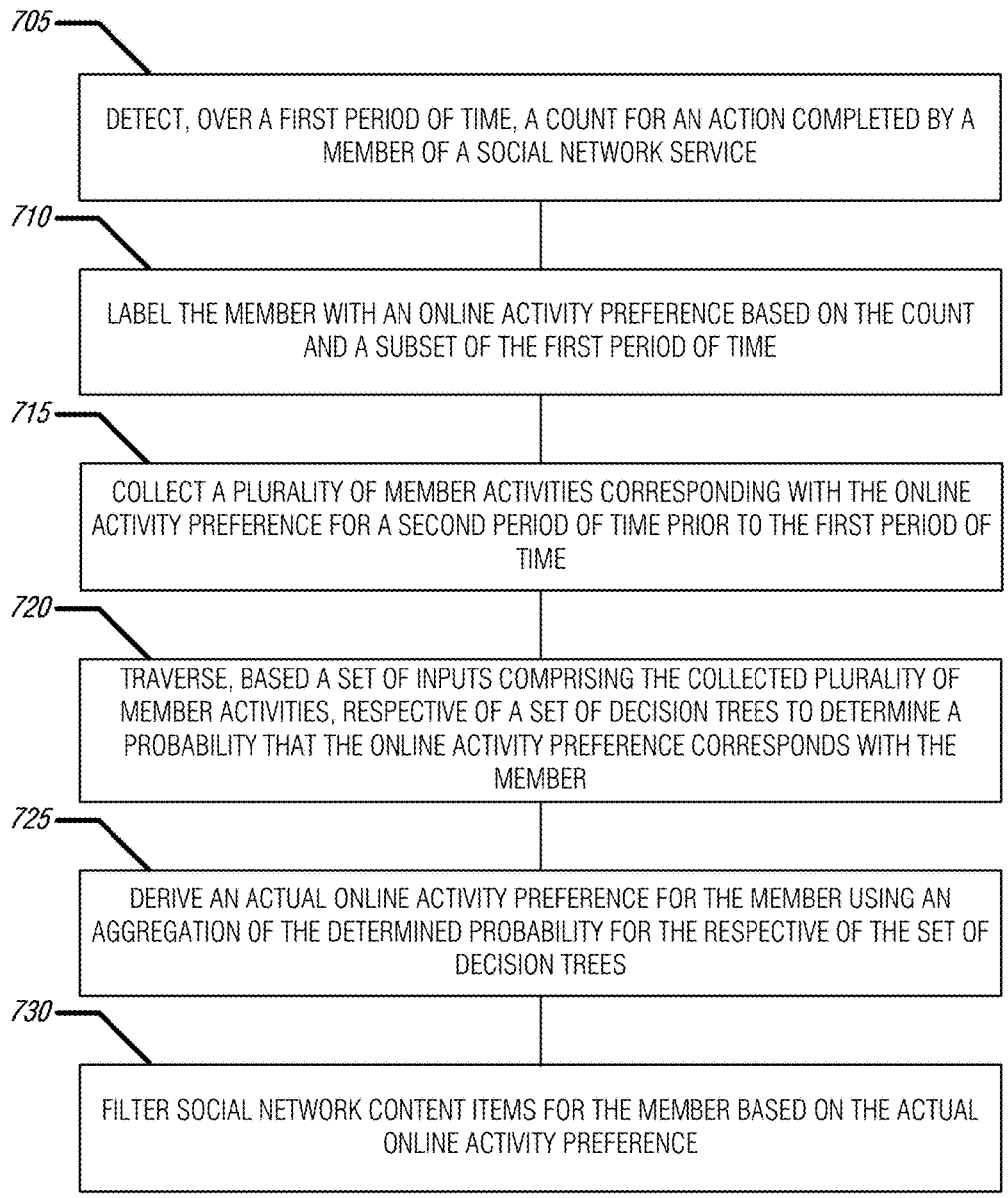
FIG. 7 is a flow diagram illustrating method operations of a method for activity sensing online preference assay, according to some embodiments.

FIG. 7 is a flow diagram illustrating method operations of a method 700 for activity sensing online preference assay, according to an embodiment. At operation 705, a count for an action completed by a member of a social network service is detected over a first period of time. In an example, the action completed by the member is submitting a job application using the social network service.

At operation 710, the member is labeled with an online activity preference based on the count and a subset of the first period of time. In an example, the first period of time is three weeks. In an example, the subset of the first period of time is one week. In an example, the count is at least 2. In some embodiments, operation 710 further comprises a second subset of the first period of time wherein the second subset of time is one week and the labeling the member with the online activity preference is based on the count corresponding to the subset of the first period of time and the count corresponding to the second subset of the first period of time.

At operation 715, a plurality of member activities corresponding with the online activity preference are collected for a second period of time prior to the first period of time.

At operation 720, respective decision trees of a set of decision trees are traversed to determine a probability that the online activity preference corresponds with the member based on a set of inputs comprising the plurality of member activities collected at operation 715. In an example, the set of inputs further comprises a set of profile information corresponding to the member. In an example, the set of inputs further comprises a plurality of search activities for the member. In an example, the set of inputs further comprises social graph data corresponding to the member.

In an example, each decision tree in the set of decision trees includes a plurality of member action nodes corresponding to a plurality of member actions. In an example, the traversing the respective decision trees of the set of decision trees to determine the probability that the online activity corresponds to the member includes comparing the set of inputs to a threshold associated with a member action corresponding with each of the plurality of member action nodes.

In an example, each decision tree in the set of decision trees includes a plurality of member search nodes corresponding to a plurality of member search activities. In an example, the traversing the respective decision trees of the set of decision trees to determine the probability that the online activity corresponds to the member includes comparing the set of inputs to a threshold associated with a member search activity corresponding with each of the plurality of member search activity nodes.

In an example, each decision tree in the set of decision trees includes a plurality of member profile component nodes corresponding to a plurality of member profile components. In an example, the traversing the respective decision trees of the set of decision trees to determine the probability that the online activity corresponds to the member includes comparing the set of inputs to a threshold associated with a member profile component corresponding with each of the plurality of member profile component nodes.

At operation 725, an actual online activity preference is derived for the member using an aggregation of the determined probability for the respective decision trees of the set of decision trees.

At operation, 730, social network content items are filtered for the member based on the actual online activity preference. In an example, filtering the social network content items includes sending an email to the member including a content item corresponding to the actual online activity preference. In an example, filtering the social network content items includes presenting the member with a set of social network content items corresponding to the actual online activity preference on a graphical user interface of the social network service.

In some embodiments, a member profile may be compared to a query of a second member of the social network service, the member profile may be retrieved in response to the query, and the member profile may be presented to the second member based on the actual online activity preference. In some embodiments, a subscription option for the member may be selected for the member based on the actual online activity preference and a message may be transmitted to the member including a selectable user interface element to update an account of the member to include the subscription option.

Figure 8:
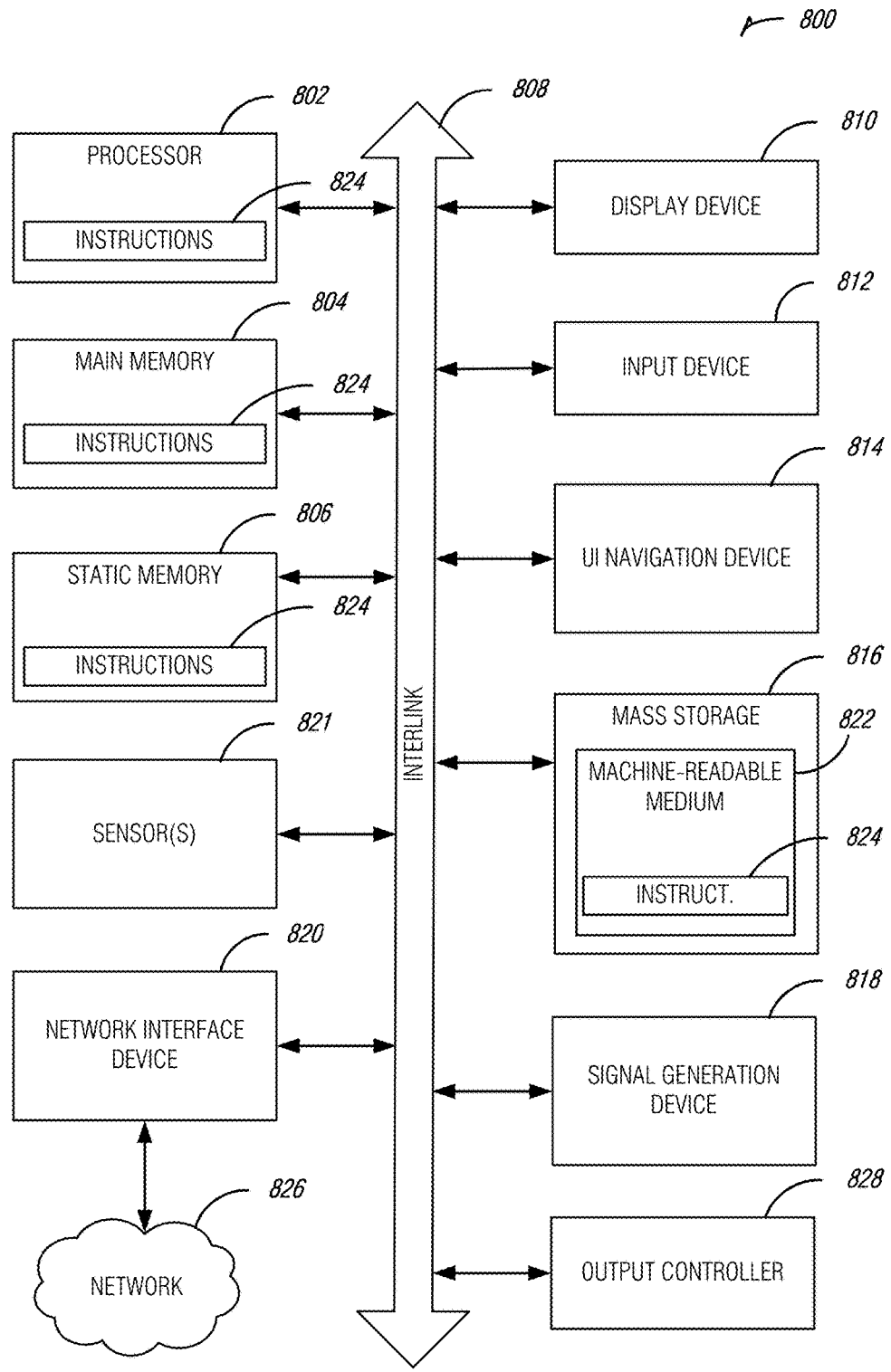
FIG. 8 is a block diagram illustrating an example of a machine upon which one or more embodiments may be implemented.

FIG. 8 illustrates a block diagram of an example machine 800 upon which any one or more of the techniques (e.g., methodologies) discussed herein may perform. In alternative embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in peer-to-peer (P2P) (or other distributed) network environment. The machine 800 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 800 may include a hardware processor 802 (e.g., a central processing unit (CPU), a graphics processing unit (GPU), a hardware processor core, or any combination thereof), a main memory 804 and a static memory 806, some or all of which may communicate with each other via an interlink (e.g., bus) 808. The machine 800 may further include a display device 810, an alphanumeric input device 812 (e.g., a keyboard), and a user interface (UI) navigation device 814 (e.g., a mouse). In an example, the display unit 810, input device 812 and UI navigation device 814 may be a touch screen display. The machine 800 may additionally include a mass storage device (e.g., drive unit) 816, a signal generation device 818 (e.g., a speaker), a network interface device 820, and one or more sensors 821, such as a global positioning system (GPS) sensor, compass, accelerometer, or other sensor. The machine 800 may include an output controller 828, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 816 may include a machine readable medium 822 on which is stored one or more sets of data structures or instructions 824 (e.g., software) embodying or utilized by any one or more of the techniques or functions described herein. The instructions 824 may also reside, completely or at least partially, within the main memory 804, within static memory 806, or within the hardware processor 802 during execution thereof by the machine 800. In an example, one or any combination of the hardware processor 802, the main memory 804, the static memory 806, or the storage device 816 may constitute machine readable media.

While the machine readable medium 822 is illustrated as a single medium, the term "machine readable medium" may include a single medium or multiple media (e.g., a centralized or distributed database, and/or associated caches and servers) configured to store the one or more instructions 824.

The term "machine readable medium" may include any medium that is capable of storing, encoding, or carrying instructions for execution by the machine 800 and that cause the machine 800 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 824 may further be transmitted or received over a communications network 826 using a transmission medium via the network interface device 820 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 820 may include one or more physical jacks (e.g., Ethernet, coaxial, or phone jacks) or one or more antennas to connect to the communications network 826. In an example, the network interface device 820 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions (such as instructions 624) for execution by the machine 800, and includes digital or analog communications signals or other intangible medium to facilitate communication of such software.

ADDITIONAL NOTES & EXAMPLES

Example 1 is a method comprising: obtaining an initial indication of an online activity preference for a member of a social network service; collecting a plurality of member activities corresponding with the online activity preference for a period of time subsequent to obtaining the initial indication; traversing, based a set of inputs comprising the collected plurality of member activities, respective decision trees of a set of decision trees to determine a probability that the online activity preference corresponds with the member; deriving an actual online activity preference for the member using an aggregation of the determined probability for the respective decision trees of the set of decision trees; and filtering social network content items for the member based on the actual online activity preference.

In Example 2, the subject matter of Example 1 optionally includes, wherein the initial indication of the online activity preference is obtained from a selectable graphical user interface element selected by the member.

In Example 3, the subject matter of any one or more of Examples 1-2 optionally include, wherein the initial indication of the online activity preference is obtained using a pattern of member activity above a threshold.

In Example 4, the subject matter of any one or more of Examples 1-3 optionally include, wherein the set of inputs further comprises a set of profile information corresponding to the member.

In Example 5, the subject matter of any one or more of Examples 1-4 optionally include, wherein the set of inputs further comprises a plurality of search activities for the member.

In Example 6, the subject matter of any one or more of Examples 1-5 optionally include, wherein each decision tree in the set of decision trees includes a plurality of member action nodes corresponding to a plurality of member actions.

In Example 7, the subject matter of Example 6 optionally includes, wherein the traversing the respective decision trees of the set of decision trees to determine the probability that the online activity corresponds to the member includes comparing the set of inputs to a threshold associated with a member action corresponding with each of the plurality of member action nodes.

In Example 8, the subject matter of any one or more of Examples 1-7 optionally include, wherein each decision tree in the set of decision trees includes a plurality of member search nodes corresponding to a plurality of member search activities.

In Example 9, the subject matter of Example 8 optionally includes, wherein the traversing the respective decision trees of the set of decision trees to determine the probability that the online activity corresponds to the member includes comparing the set of inputs to a threshold associated with a member search activity corresponding with each of the plurality of member search nodes.

In Example 10, the subject matter of any one or more of Examples 1-9 optionally include, wherein filtering the social network content items includes sending an email to the member including a content item corresponding to the actual online activity preference.

In Example 11, the subject matter of any one or more of Examples 1-10 optionally include, wherein filtering the social network content items includes presenting the member with a set of social network content items corresponding to the actual online activity preference on a graphical user interface of the social network service.

In Example 12, the subject matter of any one or more of Examples 1-11 optionally include, further comprising: comparing a member profile of the member to a query of a second member of the social network service; retrieving the member profile in response to the query; and presenting the member profile to the second member based on the actual online activity preference.

In Example 13, the subject matter of any one or more of Examples 1-12 optionally include, further comprising: selecting a subscription option for the member based on the actual online activity preference; and transmitting, to the member, a message including a selectable user interface element to update an account of the member to include the subscription option.

Example 14 is a system comprising: at least one processor; a memory; a set of instructions operable on the at least one processor to: obtain an initial indication of an online activity preference for a member of a social network service; collect a plurality of member activities corresponding with the online activity preference for a period of time subsequent to obtaining the initial indication; traverse, based a set of inputs comprising the collected plurality of member activities, respective decision trees of the set of decision trees to determine a probability that the online activity preference corresponds with the member; derive an actual online activity preference for the member using an aggregation of the determined probability for the respective decision trees of the set of decision trees; and filter social network content items for the member based on the actual online activity preference.

In Example 15, the subject matter of Example 14 optionally includes, wherein the initial indication of the online activity preference is obtained from a selectable graphical user interface element selected by the member.

In Example 16, the subject matter of any one or more of Examples 14-15 optionally include wherein the initial indication of the online activity preference is obtained using a pattern of member activity above a threshold.

In Example 17, the subject matter of any one or more of Examples 14-16 optionally include, wherein the set of inputs trees further comprises a set of profile information corresponding to the member.

In Example 18, the subject matter of any one or more of Examples 14-17 optionally include, wherein the set of inputs further comprises a plurality of search activities for the member.

In Example 19, the subject matter of any one or more of Examples 14-18 optionally include, wherein each decision tree in the set of decision trees include a plurality of member action nodes corresponding to a plurality of member actions.

In Example 20, the subject matter of Example 19 optionally includes, wherein the traversing the respective decision trees of the set of decision trees to determine the probability that the online activity corresponds to the member includes comparing the set of inputs to a threshold associated with a member action corresponding with each of the plurality of member action nodes.

In Example 21, the subject matter of any one or more of Examples 14-20 optionally include, wherein each decision tree in the set of decision trees include a plurality of member search nodes corresponding to a plurality of member search activities.

In Example 22, the subject matter of Example 21 optionally includes, wherein the traversing the respective decision trees of the set of decision trees to determine the probability that the online activity corresponds to the member includes comparing the set of inputs to a threshold associated with a member search activity corresponding with each of the plurality of member search nodes.

In Example 23, the subject matter of any one or more of Examples 14-22 optionally include, wherein to filter the social network content items includes sending an email to the member including a content item corresponding to the actual online activity preference.

In Example 24, the subject matter of any one or more of Examples 14-23 optionally include, wherein to filter the social network content items includes presenting the member with a set of social network content items corresponding to the actual online activity preference on a graphical user interface of the social network service.

In Example 25, the subject matter of any one or more of Examples 14-24 optionally include, further comprising: compare a member profile of the member to a query of a second member of the social network service; retrieve the member profile in response to the query; and present the member profile to the second member based on the actual online activity preference.

In Example 26, the subject matter of any one or more of Examples 14-25 optionally include, further comprising: select a subscription option for the member based on the actual online activity preference; and transmit, to the member, a message including a selectable user interface element to update an account of the member to include the subscription option.

Example 27 is a non-transitory machine readable medium that stores instructions which when performed by a machine, cause the machine to perform operations comprising: obtaining an initial indication of an online activity preference for a member of a social network service; collecting a plurality of member activities corresponding with the online activity preference for a period of time subsequent to obtaining the initial indication; traversing, based a set of inputs comprising the collected plurality of member activities, respective decision trees of the set of decision trees to determine a probability that the online activity preference corresponds with the member; deriving an actual online activity preference for the member using an aggregation of the determined probability for the respective decision trees of the set of decision trees; and filtering social network content items for the member based on the actual online activity preference.

In Example 28, the subject matter of Example 27 optionally includes, wherein the initial indication of the online activity preference is obtained from a selectable graphical user interface element selected by the member.

In Example 29, the subject matter of any one or more of Examples 27-28 optionally include, wherein the initial indication of the online activity preference is obtained using a pattern of member activity above a threshold.

In Example 30, the subject matter of any one or more of Examples 27-29 optionally include, wherein the set of inputs further comprises a set of profile information corresponding to the member.

In Example 31, the subject matter of any one or more of Examples 27-30 optionally include, wherein the set of inputs further comprises a plurality of search activities for the member.

In Example 32, the subject matter of any one or more of Examples 27-31 optionally include, wherein each decision tree in the set of decision trees include a plurality of member action nodes corresponding to a plurality of member actions.

In Example 33, the subject matter of Example 32 optionally includes, wherein the traversing the respective decision trees of the set of decision trees to determine the probability that the online activity corresponds to the member includes comparing the set of inputs to a threshold associated with a member action corresponding with each of the plurality of member action nodes.

Example 34, the subject matter of any one or more of Examples 27-33 optionally include, wherein each decision tree in the set of decision trees include a plurality of member search nodes corresponding to a plurality of member search activities.

In Example 35, the subject matter of Example 34 optionally includes, wherein the traversing the respective decision trees of the set of decision trees to determine the probability that the online activity corresponds to the member includes comparing the set of inputs to a threshold associated with a member search activity corresponding with each of the plurality of member search nodes.

In Example 36, the subject matter of any one or more of Examples 27-35 optionally include, wherein filtering the social network content items includes sending an email to the member including a content item corresponding to the actual online activity preference.

In Example 37, the subject matter of any one or more of Examples 27-36 optionally include, wherein filtering the social network content items includes presenting the member with a set of social network content items corresponding to the actual online activity preference on a graphical user interface of the social network service.

In Example 38, the subject matter of any one or more of Examples 27-37 optionally include, further comprising: comparing a member profile of the member to a query of a second member of the social network service; retrieving the member profile in response to the query; and presenting the member profile to the second member based on the actual online activity preference.

In Example 39, the subject matter of any one or more of Examples 27-38 optionally include, further comprising: selecting a subscription option for the member based on the actual online activity preference; and transmitting, to the member, a message including a selectable user interface element to update an account of the member to include the subscription option.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:
1. A system comprising:
at least one processor;
a memory;
a set of instructions operable on the at least one processor to:
obtain an initial indication of an online activity preference for a member of a social network service, wherein the online activity preference is determined based on an activity preference profile attribute of the member;
collect a plurality of member activities corresponding with the online activity preference for a period of time subsequent to obtaining the initial indication;
traverse, based on a set of inputs comprising the collected plurality of member activities, respective decision trees of a set of decision trees to determine a probability that the online activity preference corresponds with the member;
derive an actual online activity preference for the member using an aggregation of the determined probability for the respective decision trees of the set of decision trees, wherein to derive the actual online activity preference a positive probability count is compared to a negative probability count, wherein the positive probability count indicates a number of decision trees of the set of decision trees that indicate the actual online activity preference likely corresponds to the member, and wherein the negative probability count indicates a number of decision trees of the set of decision trees that indicate the actual online activity preference is unlikely to correspond to the member;
update the activity preference profile attribute of the member based on the actual online activity preference; and
filter social network content items for the member based on the actual online activity preference.

2. The system of claim 1, wherein each decision tree in the set of decision trees includes a plurality of member action nodes corresponding to a plurality of member actions.

3. The system of claim 2, wherein the traversing the respective decision trees of the set of decision trees to determine the probability that the online activity corresponds to the member includes comparing the set of inputs to a threshold associated with a member action corresponding with each of the plurality of member action nodes.

4. The system of claim 1, wherein each decision tree in the set of decision trees includes a plurality of member search nodes corresponding to a plurality of member search activities.

5. The system of claim 4, wherein the traversing the respective decision trees of the set of decision trees to determine the probability that the online activity corresponds to the member includes comparing the set of inputs to a threshold associated with a member search activity corresponding with each of the plurality of member search nodes.

6. The system of claim 1, wherein to filter the social network content items includes presenting the member with a set of social network content items corresponding to the actual online activity preference on a graphical user interface of the social network service.

7. The system of claim 1, the set of instructions further comprising instructions operable on the at least one processor to:
compare a member profile of the member to a query of a second member of the social network service;
retrieve the member profile in response to the query; and
present the member profile to the second member based on the actual online activity preference.

8. A non-transitory machine readable medium that stores instructions which when performed by a machine, cause the machine to perform operations comprising:
obtaining an initial indication of an online activity preference for a member of a social network service, wherein the online activity preference is determined based on an activity preference profile attribute of the member;
collecting a plurality of member activities corresponding with the online activity preference for a period of time subsequent to obtaining the initial indication;
traversing, based on a set of inputs comprising the collected plurality of member activities, respective decision trees of a set of decision trees to determine a probability that the online activity preference corresponds with the member;
deriving an actual online activity preference for the member using an aggregation of the determined probability for the respective decision trees of the set of decision trees, wherein deriving the actual online activity preference includes comparing a positive probability count to a negative probability count, wherein the positive probability count indicates a number of decision trees of the set of decision trees that indicate the actual online activity preference likely corresponds to the member, and wherein the negative probability count indicates a number of decision trees of the set of decision trees that indicate the actual online activity preference is unlikely to correspond to the member;
updating the activity preference profile attribute of the member based on the actual online activity preference; and
filtering social network content items for the member based on the actual online activity preference.

9. The machine readable medium of claim 8, wherein each decision tree in the set of decision trees includes a plurality of member action nodes corresponding to a plurality of member actions.

10. The machine readable medium of claim 9, wherein the instructions for traversing the respective decision trees of the set of decision trees to determine the probability that the online activity corresponds to the member includes instructions for comparing the set of inputs to a threshold associated with a member action corresponding with each of the plurality of member action nodes.

11. The machine readable medium of claim 8, wherein each decision tree in the set of decision trees includes a plurality of member search nodes corresponding to a plurality of member search activities.

12. The machine readable medium of claim 11, wherein the instructions for traversing the respective decision trees of the set of decision trees to determine the probability that the online activity corresponds to the member includes instructions for comparing the set of inputs to a threshold associated with a member search activity corresponding with each of the plurality of member search nodes.

13. The machine readable medium of claim 8, wherein the instructions for filtering the social network content items includes instructions for presenting the member with a set of social network content items corresponding to the actual online activity preference on a graphical user interface of the social network service.

14. The machine readable medium of claim 8, further including instructions that cause the machine to perform operations comprising:
comparing a member profile of the member to a query of a second member of the social network service;
retrieving the member profile in response to the query; and
presenting the member profile to the second member based on the actual online activity preference.

15. A method comprising:
obtaining an initial indication of an online activity preference for a member of a social network service, wherein the online activity preference is determined based on an activity preference profile attribute of the member;
collecting a plurality of member activities corresponding with the online activity preference for a period of time subsequent to obtaining the initial indication;

traversing, based on a set of inputs comprising the collected plurality of member activities, respective decision trees of a set of decision trees to determine a probability that the online activity preference corresponds with the member;

deriving an actual online activity preference for the member using an aggregation of the determined probability for the respective decision trees of the set of decision trees, wherein deriving the actual online activity preference includes comparing a positive probability count to a negative probability count, wherein the positive probability count indicates a number of decision trees of the set of decision trees that indicate the actual online activity preference likely corresponds to the member, and wherein the negative probability count indicates a number of decision trees of the set of decision trees that indicate the actual online activity preference is unlikely to correspond to the member;

updating the activity preference profile attribute of the member based on the actual online activity preference; and filtering social network content items for the member based on the actual online activity preference.

16. The method of claim 15, wherein each decision tree in the set of decision trees includes a plurality of member action nodes corresponding to a plurality of member actions.

17. The method of claim 16, wherein the traversing the respective decision trees of the set of decision trees to determine the probability that the online activity corresponds to the member includes comparing the set of inputs to a threshold associated with a member action corresponding with each of the plurality of member action nodes.

18. The method of claim 15, wherein each decision tree in the set of decision trees includes a plurality of member search nodes corresponding to a plurality of member search activities.

19. The method of claim 18, wherein the traversing the respective decision trees of the set of decision trees to determine the probability that the online activity corresponds to the member includes comparing the set of inputs to a threshold associated with a member search activity corresponding with each of the plurality of member search nodes.

20. The method of claim 15, wherein filtering the social network content items includes presenting the member with a set of social network content items corresponding to the actual online activity preference on a graphical user interface of the social network service.

21. The method of claim 15, further comprising:
comparing a member profile of the member to a query of a second member of the social network service;
retrieving the member profile in response to the query; and
presenting the member profile to the second member based on the actual online activity preference.

* * * * *